United States Patent [19]

Knox et al.

[11] 4,072,779

[45] Feb. 7, 1978

[54] POLYETHYLENE TEREPHTHALATE FILM

[75] Inventors: Kenneth Leith Knox, Circleville, Ohio; Joseph Kolb Lees, Wilmington, Del.

[73] Assignee: E. I. Du Pont de Nemours and Company, Wilmington, Del.

[21] Appl. No.: 592,075

[22] Filed: June 30, 1975

Related U.S. Application Data

[63] Continuation of Ser. No. 284,131, Aug. 28, 1972, abandoned.

[51] Int. Cl.$^2$ .................. C08G 63/70; C08G 63/18
[52] U.S. Cl. ......................... 428/220; 260/75 T; 264/289; 428/430; 428/441; 428/446; 428/483
[58] Field of Search ............. 260/75 T; 264/288, 289

[56] References Cited

U.S. PATENT DOCUMENTS

| | | | |
|---|---|---|---|
| 2,823,421 | 2/1958 | Scarlett | 264/289 X |
| 2,968,065 | 1/1961 | Gronholtz | 260/75 T X |
| 2,975,484 | 3/1961 | Amborski | 260/75 T X |
| 2,995,779 | 8/1961 | Winter | 260/75 T X |
| 3,165,499 | 1/1965 | Alles | 260/75 T |
| 3,282,722 | 11/1966 | Hailstone | 161/199 X |
| 3,627,579 | 12/1971 | Heffelfinger | 260/75 T X |
| 3,734,994 | 5/1973 | Blecha | 264/288 |
| 3,786,127 | 1/1974 | Peet et al. | 264/288 |
| 3,807,004 | 4/1974 | Andersen | 264/288 X |
| 3,869,533 | 3/1975 | Janocha et al. | 264/288 X |

Primary Examiner—Lester L. Lee
Assistant Examiner—W. C. Danison, Jr.

[57] ABSTRACT

An asymmetrically oriented, heat set, polymeric film is provided for use in laminated structures, such film having many desired mechanical and thermal properties, such as good dimensional and thermal stability and being frangible and further having improved optical properties, being substantially clear and haze free and free of distortion and being substantially free of color fringes upon viewing in partially polarized light. This film is particularly useful in glazing structures.

For glazing applications, a two-ply laminated structure is provided comprising this specific film bonded to a layer of polyvinyl butyral or other tough elastomeric film; and, further provided is a three-ply laminated structure consisting of this two-ply laminated structure coated on its other surface with an abrasion-resistant material.

The film finds a preferred use in a laminated structure comprising:

| Polyvinyl butyral |
|---|
| Asymmetrically oriented, heat set, frangible, polyethylene terephthalate film |
| Abrasion-resistant coating |

2 Claims, No Drawings

POLYETHYLENE TEREPHTHALATE FILM

This is a continuation of application Ser. No. 284,131, filed Aug. 28, 1972.

BACKGROUND OF THE INVENTION

1. Field of the Invention

This invention is an asymmetrically oriented, heat set, polymeric film which is frangible, thermally stable, optically clear, and which is substantially free of color fringes upon viewing in partially polarized light.

Such film may be bonded to materials, such as polyvinyl butyral, to form a two-ply laminated structure, which structure further may be bonded to a glass layer of a glazing structure to provide desired optical and mechanical characteristics. Preferably, the free surface of the film is coated with an abrasion-resistant coating, when used in these structures.

2. Description of the Prior Art

The use of polymeric films in glazing applications is old. The problem has been to obtain all of the desired properties in the structures made using such films.

Canadian Pat. No. 596,193 to Gore et al. is exemplary of the prior art. Such patent is directed to a safety-glass laminate having a number of layers one of which is a sheet of biaxially oriented polyethylene terephthalate. While this film possesses a number of the desired properties sought in windshield use applications, it lacks other properties, such as frangibility and freedom from color fringes or "rainbow effects," as key examples.

Other U.S. Patents of the prior art are: U.S. Pat. Nos. 2,526,728 to Burk et al., 2,837,454 to Watkins, and 3,437,552 to Bowen.

None of these patents, taken singly or in combination, suggest the specific polymeric film of this invention which, in combination with the other materials in laminate form, provides the total combined properties of frangibility, optical clarity, thermal stability, formability and the like and, at the same time, possesses the highly sought after additional, and critical in automotive glazing use areas, property of being substantially free of color fringes upon viewing transmitted polarized light. The provision of all of these properties in a single film is the touchstone of this invention.

SUMMARY OF THE INVENTION

In one form, this invention is the use of the special film, also of this invention, in making a glazing structure having improved safety features.

The introduction of laminated safety glass for automotive glazing structures substantially reduced the hazard from flying glass shards. Such structures, generally curved in present use, consist of two layers of glass bonded to a central layer of a tough, stretchable material, preferably plasticized polyvinyl butyral, and are designed to have a strength to allow bending breakage, but not penetration, by the head of an occupant upon impact in a collision. The problem is that lacerations of the head may result by the head sliding over the fragmented surface of the inner glass layer after impact. A layer of the same tough, stretchable material, e.g., polyvinyl butyral, used as the inner layer can negate this additional source of injury, but such material is soft and easily dented and marred by contacts. Additionally, it is not resistant to ordinary abrasion as in washing, nor is it adequate from the standpoint of weather stability.

To protect this tough, soft layer requires a material with a modulus, or rigidity, sufficiently high to prevent denting, yet having frangibility (impact strength) characteristics low enough not to materially alter the other required properties of the glazing structure. Further, the mar-preventing component or shield must be abrasion-resistant per se, or capable of accepting an abrasion-resistant coating. Such coatings usually are applied or cured at elevated temperatures, such as by a high temperature curing step, hence the mar-preventing component must be capable of treatment at elevated temperatures. With regard to thermal stability, the component should be formable for shaping to conform to complex curvatures and for lamination or bonding to the polyvinyl butyral layer. This step generally requires processing at elevated temperatures.

Further, all of the foregoing requirements must tie in with a major additional requirement: the optical properties of the shield. The need for low haze and freedom from optical discontinuities such as gel and lens-like occlusions are, of course, significant, as are means for their achievement. A uniform thickness also is necessary to avoid lens-like optical distortion. The freedom from "rainbow effect" is equally important. The achieving of this combination of desired optical properties is quite complex.

If the material of any component of the glazing structure in the viewing system is anisotropic to partially polarized light, for example, "rainbow effects" can occur. The requirement of freedom from color fringes when viewed in partially polarized daylight is a critical one. Means and materials for achieving this required optical property, in combination with other desired mechanical, thermal and optical properties, are the goals the present invention seeks and achieves.

DESCRIPTION OF THE PREFERRED EMBODIMENTS

The essential discovery of this invention is a polymeric film that is frangible, thermally stable, optically clear and substantially free of color fringes upon viewing in partially polarized light from reflected skylight, which film may be combined with other materials, such as polyvinyl butyral and a coating that is abrasion-resistant to provide a shield for use in glazing applications.

A preferred shield, or three-ply laminated structure of this invention, comprises a layer of plasticized polyvinyl butyral bonded to one surface of the specific, critical, film of this invention, the other surface of which is coated with an abrasion-resistant material such as "Abcite ®", an abrasion-resistant coating supplied in a system by E. I. du Pont de Nemours and Company.

The preferred glazing structure to which the shield of the present invention is applied is a three-layer composite of a layer of a transparent, tough, extensible, tacky material, e.g., polyvinyl butyral of 30-mil thickness, sandwiched between two layers of thin glass which are bonded together under the action of heat and pressure, as shown, for example, in U.S. Pat. No. 3,231,461 to Mattimoe. These combined structures, in which the coated film is an outermost layer, usually are cured at about 130° to 150° C. for 7 to 180 minutes.

As to the specific film of this invention, it has been found that a novel, specially made, polymeric film oriented in primarily only one direction and heat set possesses the critical properties required in certain glazing uses. Such film preferably is a polyethylene terephthalate film that has a low machine direction (MD) stretch and a high transverse machine direction (TD) stretch, made using a clear, haze-free polymer.

A large number of properties are required of the film. Among these properties, all of which are found in the film of this invention, are:

1. Optical clarity, e.g., clear, haze-free, and free of optical distortion;
2. Adherable to materials, such as polyvinyl butyral and an abrasion-resistant coating;
3. Frangible;
4. Heatable to at least 130° C. for forming, laminating and coating;
5. Free of interference color by reason of having a retardation of at least more than 5,000 millimicrons; and
6. Thick enough and stiff enough to prevent marring or indentation when backed by a "soft" material lamiated to glass.

These properties are found in the specific polymeric films of this invention.

Retardation may be defined in terms of birefringence and film thickness, and to obtain the critical retardation required in the film of this invention, a high birefringence is essential.

Birefringence is a dimensionless number and is a direct measure of the maximum difference of the refractive indices of the film on perpendicular axes. When a birefringent film such as oriented polyethylene terephthalate transmits a beam of plane polarized light which strikes perpendicular to the axis of orientation (normal to the plane of the sheet, for example), the light is split into two beams polarized at angles to each other, one of which travels faster than the other. The distance that one of these beams is behind the other when they emerge from the film is related to the retardation of the sample (expressed in millimicrons) and this is related to the film thickness and to birefringence, $\Delta n$, by the equation:

Retardation = thickness × birefringence.

Thickness can be measured readily; birefringence is determined by subtracting the maximum refractive index measured in one direction from the minimum at a direction at right angles to the maximum. The refractive index is measured by means of a Zeiss refractometer, employing a high refractive index liquid, such as diiodomethane, to wet the interface between the film and the optics of the instrument.

The preferred asymmetrically oriented, heat set polyethylene terephthalate of this invention has a high birefringence; it is this property, surprisingly, that helps solve the troublesome "rainbow effect" problem that confronts the art in certain novel glazing structures herein described.

The utility of films with high birefringence in the window-making, glass arts, use areas may be explained in terms of the total retardation of polarized light afforded by such structures. Interference color fringes can be observed generally when a birefringent film in white light is viewed between two crossed polarizing filters. If the retardation of the film (the product of the thickness in millimicrons and the birefringence) is 90 millimicrons or less, the film appears colorless. As the retardation is increased to 500 millimicrons (by increasing birefringence or thickness or both), the fringes go through the color spectrum followed by a diffuse gray zone. Above about 550 millimicrons, a second order interference pattern appears, and above about 1100 millimicrons, a third order is seen. Films having a retardation displaying the color spectrum are not effective, due to the polarized light problem, as previously described. Above 5,000 to 7,000 millimicrons, multiple interference occurs to such an extent that the films appears continuously colorless. A stretched film with a birefringence of 0.07 and a thickness of 0.004 inch (100,000 millimicrons) has a retardation of 7,000 and is satisfactory in optical neutrality. An unoriented film, on the other hand, has a birefringence of zero, but slight strains can cause color fringes. So-called "balanced" biaxially oriented film usually has birefringence values of 0.01 to 0.03, and with thickness in the range of 12,000 to 100,000 millimicrons (0.0005 to 0.004 inch), would produce color fringes. The film of this invention does not show these fringes, and solves this difficult optical problem.

As important as the optical considerations are in the film of this invention, equally critical are the mechanical property demands placed on such film.

The role of the polymeric film component of the present invention in the glazing arts requires, for example, that it possess sufficient hardness, thickness and rigidity to resist indentation and scratching when backed by a soft, pliable component (i.e., polyvinyl butyral). It must perform this function without materially altering the impact behavior of the entire structure, including the glass components. A conflict arises between the requirements for this mar protection, on one hand, and low impact strength, on the other. In order to prevent indentation, thin films with low modulus are unacceptable, as are thicker films which have excessive impact strength.

To minimize injury to automobile occupants caused by impact and deceleration, the severity index of the glazing structure, on a scale established by manufacturers to relate impact and deceleration, must be below a predeterined value. While there is no single property of the unsupported film that can be conveniently measured and correlated with severity index, pneumatic impact strength if considered along with other properties, such as elongation at break, is a useful guide. This lack of full correlation arises from differences in the fracture behavior of the film in use and in the impact testing procedures under some conditions.

In a glazing structure wherein the film is fully supported by the laminated glass structure, upon breakage of the glass the film is subjected to intense stresses along lines where the glass breaks, with little or no stress in areas between. This causes high elongation rates along these lines, leading to brittle fracture. In the pneumatic impact test, on the other hand, substantial areas of the film are subjected to the impact energy with the result that elongation is distributed through a large volume. Accordingly, the fracture mechanism depends upon the film thickness and the testing parameters. The capability of the film to accommodate the shock of impact through this larger volume, especially in thicker films, results in a more ductile fracture at lower energies. Accordingly, to achieve the same brittle fracture mechanism for thicker films, pneumatic impact measurements are made at higher impact energies (ball velocity). The numerical results of impact tests as indiators of utility must be considered in view of the thickness of the sample and the energy parameter in testing (i.e., the ball velocity).

With the above explanations in mind, to provide a glazing structure having an acceptable severity index, the total impact energy of the film should not exceed about 10 kg.-cm. when the impact energy is measured in a suitable test designed to simulate the impact behavior of the film in a laminated structure, as will further be explained.

Films of polymers, such as polymers and polyamides, with balanced biaxial orientation, quite apart from the difficulty of achieving a satisfactory freedom from interference colors, are generally unacceptable because at thicknesses suitable for mar protection, the total impact strength is excessive.

According to the present invention, certain asymmetrically oriented, heat set films have been found to possess sufficient rigidity, with modulus values generally greater than 300,000 psi, and yet have the requisite frangibility which enables them to be used in protective thicknesses without excessively adding to the impact characteristic of the glass structure. Films of this type are stretched in one direction only, or in two directions at highly unbalanced levels of stretch ratio (under conditions generally taught by U.S. Pat. No. 2,823,421 to Scarlett to achieve high birefringence) and, thereafter, are heat set to a crystallinity above about 1.360. Said films, which have a low tensile strength at break and elongation at break in at least one direction, and are known as fibrillating films, possess the required frangibility, having low impact and tear strength.

The heat setting step is an important one in that it brings a desired high density characteristic to the film. Such high density, which is indicative of high crystallinity, not only furthers the required low impact strength, but also enhances dimensional stability of the film at elevated temperatures, used during curing, for example. A polyethylene terephthalate film, as a preferred example, stretched 1.00 times its length and 3.5 times its width and heat set at 150° C. under restraint to a density of greater than 1.360 g./cc. upon being freely suspended at 135° C. has a shrinkage no greater than 5% in length or width. This low shrinkage, combined with the absence of development of haze upon heating, provides the required thermal stability and the frangibility in the film makes it acceptable for the uses contemplated by this invention. Such low shrinkage can occur without harm during the application, for example, of the scratch resistant coating, further to be described, at the high temperatures used. In applying the abrasion-resistant coating to the film, baking temperatures of 135° C. may be required for periods of up to 24 hours.

Additionally, in laminating a shield of the present invention to a glazing structure, for example, (wherein the polyvinyl butyral surface comes into contact with a glass layer) to form a laminated structure of such invention, to assure maximum strength of the bond, the parts are heated at autoclave temperature from about 130° to 150° C. for 7 to 180 minutes.

The film to be subjected to these temperatures must, accordingly, have certain critical thermal stability properties to perform, as required, in the glazing arts; the film of this invention has these properties.

From the viewpoint of certain major requirements of the hard protective film component of this invention, i.e., low impact strength, thermal stability and the optical property of color neutrality in polarized light, there would appear to be a wide variety of suitable materials, from the standpoint of both chemical composition and of macromolecular structure, i.e., orientation. Such is not the case, as has been and as will further be explained.

At first glance, for example, it would appear that amorphous unoriented polyethylene terephthalate structures would be ideal. They are optically isotropic and, being free of orientation, undergo little irreversible dimensional change at elevated temperatures. It has been found, however, that such amorphous, unoriented films tend to slowly crystallize and develop haze upon heating or aging. Such films also have a low softening temperature. Further, although often they are nominally isotropic, they tend to show fringes of orientation if stressed in forming around sharp curves.

With the low impact strength required, from the viewpoint of economy of material, thin balanced biaxially oriented film would appear workable in this specific glazing use area. Such films, however, were found unsuitable, for even under the most ideal drawing conditions, color fringes from birefringence are very apparent, even within very small areas of the best commercial balanced film.

While the foregoing points to the desirability of having a film free of birefringence, it has been found, unexpectedly, that a sheet with precisely the opposite property is the most useful; i.e., a material with a high birefringence has been found to be free of color fringes upon viewing in partially polarized light. That is the crux of this invention.

Oriented films with a high degree of asymmetry of orientation and high birefringence, such as uniaxially oriented films or films produced with an unbalanced stretch ratio, have this characteristic. In addition to such uniaxially oriented films (or films with a highly unbalanced stretch ratio) being suiable optically, they further have a low impact strength. Highly unbalanced, heat set (crystallized) films of polymers, such as polyesters, have very low tensile strength and elongation at break in one direction and tend to fibrillate and have low impact strength. This is the film that has been sought, and found.

Such unbalanced (asymmetrically oriented) films with low impact strength and high birefringence can be produced, for example, by stretching in one direction, only, e.g., 3-4 times its length or width and heat setting, or by stretching 3.5 times in one direction and 1.25 times in the other direction and heat setting.

It is recongized in the art, such as in U.S. Pat. No. 3,677,579, to Heffelfinger, that heat set films of higher molecular weight polymer, such as polyethylene terephthalate with an intrinsic viscosity of above 0.65 (60/40 tetrachloroethane phenol) are difficult to fibrillate (i.e., they have a higher impact strength); therefore, stretch ratio values and the degree of heat setting may have to be higher to achieve a desired fibrillating structure as the intrinsic viscosity of the film approaches this value. Films with viscosities of the order of 0.70 can be made sufficiently frangible if uniaxial orientation and densities are very high. It further will be recognized that the frangibility level of the film (i.e., its impact strength) has limits; i.e., it must not be so readily frangible that the film is incapable of being handled during making, winding and processing. Viscosities as low as 0.45 can be used if care is used in processing, such as using the lower density limit.

The polymeric film used in the laminated or glazing structures of this invention preferably is 1–10 mils in thickness. Both surfaces of the film may be conditioned so as to enhance their ability to adhere to the tough, extensible layer, preferably of polyvinyl butyral and the abrasion-resistant coating. When used as a shield for the polyvinyl butyral layer, the film thickness must exceed 1 mil.

The preferred method of conditioning the surface or surfaces of the polymeric film layer for good adhesion, is by direct contact of it with a gas flame for a period of time sufficient to alter the surface characteristics of the treated material, but not for a period of time long enough to change the bulk properties of the material. Various patents showing flame treating methods acceptable to this invention are U.S. Pat. No. 2,632,921 to Kreidl, U.S. Pat. No. 2,648,097 to Kritchever, U.S. Pat. No. 2,683,894 to Kritchever and U.S. Pat. No. 2,704,382 to Kreidl. In particular, a reducing flame (high fuel-/oxygen ratio) is preferred. If desired, other known electrical and chemical surface conditioning treatments may be used.

The abrasion-resistant coating material, which is applied from solution and requires heat treatment for developing its desired properties preferably, is coated on the film before combining the film with the polyvinyl butyral layer. Generally, a temperature of 135° C. for several hours is required for the "curing" step in this coating application. Such coating material preferably is a composition comprising (1) a fluorocarbon-containing copolymer, and (2) a cross-linking agent, for example, polysilicic acid or derivatives thereof, melamine formaldehyde resins, or polyfunctional aromatic and aliphatic carboxylic acids or derivatives thereof.

Various abrasion-resistant coating materials usable in this invention are described in U.S. Pat. Nos. 3,547,318 to Vest; 3,514,425 to Herman; 3,390,203 to Engelhardt; 3,429,845 to Bechtold et al.; 3,429,846 to Bechtold et al.; 3,476,827 to Engelhardt; and, U.S. patent application Ser. No. 791,170, filed Jan. 14, 1969.

A particularly workable abrasion-resistant coating is a composition comprising (1) a fluorocarbon-containing copolymer and (2) polymeric acid, available under the trademark "Abcite ®", owned by E. I. du Pont de Nemours and Company. Such coating material offers great resistance to abrasion, solvents and weathering and shows little haze development while maintaining the optical properties of the base film. The coated film may be fabricated utilizing the same procedures and techniques used for conventional polymeric film, such as thermoforming, etc.

The preferred polyvinyl butyral layer of a glazing structure of this invention is plasticized and may be prepared by methods known to those skilled in the art, as is described, for example, in U.S. Pat. No. 2,720,501 to Van Ness; U.S. Pat. No. 2,400,957 to Stamatoff; and, U.S. Pat. No. 2,739,080 to Woodworth. Such polyvinyl butyral material is available commercially under the trademark "Butacite ®" for plasticized polyvinyl butyral resin, owned by E. I. du Pont de Nemours and Company.

Another workable material for use as the tough, stretchable layer (or layers) is an ionic hydrocarbon polymer of the type described in U.S. Pat. No. 3,264,272 to Rees.

The glass used in the laminated structure preferably ranges from about 0.04 to 0.15 (preferably 0.10) inch in thickness. The glass may be annealed, thermally tempered, or chemically tempered glass, for example.

Another embodiment of this invention is exemplified in a glazing structure consisting of a six-ply laminated structure comprising glass, polyvinyl butyral, glass, polyvinyl butyral, the special polyethylene terephthalate film, and an abrasion-resistant coating, such film having an optical retardation of greater than 5,000 millimicrons.

This invention, in still another embodiment, is a laminated structure formed by a method comprising the steps of: forming an asymmetricaly oriented, heat set, frangible, polyethylene terephthalate film; activating the surfaces of such film, by flame or other treatment, to enhance their adherability properties; applying to one such activated surface of the film an abrasion-resistant coating; curing such coating at a temperature of at least 110° C. for a period of several days; and, applying a polyvinyl layer to the other such surface of the film to bond it thereto under heat and pressure.

Optical properties other than freedom from color fringes associated with light polarization are also critical. These properties include optical clarity or transparency, which includes freedom from both internal and external haze and freedom from surface imperfections or optical discontinuities which would impair clear vision through the film. This clarity is exclusive of dyes or pigments which may be added for optical effects, such as for screening sunlight or glare.

A further requirement, as mentioned earlier, is the freedom from lens-like optical distortion of film for glazing use. A major source of such distortion is in repetitive, abrupt gauge variation. It is apparent as distortion of a viewed object, especialy where the line of sight is at a low angle to the surface of the transparent medium through which the object is viewed. It is particularly troublesome where there is relative motion between the viewer and the object; in such cases motion appears irregular, making it difficult to properly judge the speed and location of the object. This distortion can also be observed as light and dark shadows by shining a line source of light through the film onto a white screen. It has been found that to be acceptably free of distortion, the film should not have gauge (thickness) variations of more than 1% per inch along the surface. Greater variations than this result in sharp lens-like curvatures, causing these optical distortions.

To minimize such optical distortion, the process used to make the film of this invention preferably employs a casting method in which the space between the extrusion orifice and the quench drum is small, so that the extruded polymer forms a pool, filling the space between the orifice and the drum cross the width of the extrudate. Drum rotation pulls polymer from this pool, to form a film on the drum. The thickness of the formed film is controlled by the clearance between the drum and a doctor blade positioned across the width of the drum, parallel to its axis. Air streams from sources spaced around the drum are used to supplement cooling by the cooled drum. A calender roll is used to smooth the film. With this casting method, film of this invention with less than 1% gauge deviation per inch and acceptably free of optical distortion is obtained. (The gauge deviation was determined with a Pratt and Whitney electromicrograph Model D, with measurements made in one-sixteenth inch steps across the surface of the film.)

The present invention has been described and exemplified with particular reference to polyethylene terephthalate and it is to be understood that the invention comprehends any similar polyester films.

As used herein, tensile strength means the force or pull per unit of cross sectional area, expressed in pounds per square inch, which is required to break the film at room temperature. Elongation is the extent to which the film will stretch before breaking when subjected to unidirectional stress at 100% elongation per minute. Tensile modulus, or initial tensile modulus, usually referred to as simply modulus and expressed as pounds per square inch, is the slope of the stress-strain curve at 1% elongation as the film is being elongated at 100% per minute. The film tensile properties were determined by use of an Instron tensile testing machine (Model TT-B, Instron Engineering Co., Quincy, Mass.) using a sample length of film of two inches having a width of one inch, and elongating the sample at a rate of 100% per minute. The apparatus produces a load elongation chart from which the appropriate values may be calculated.

Pneumatic impact strength is the energy required to rupture a film and it is expressed in kg.-cm. Pneumatic impact strength is determined by measuring the velocity of a projectile, mechanically accelerated by air pressure, first in free flight and then in flight immediately after being impeded by rupturing the film test sample. In this test, the film sample is 1¾ × 1¾ inches and the projectiles are steel balls ½ inch in diameter and weighing 8.3 grams. The free flight velocity of the ball is 40 ± 2 meters per second for films up to 7 mils thick and 115 ± 2 meters per second for films 7 to 10 mils thick. The velocities are measured by timing photoelectrically the passage of the steel balls between two light beams set a known measured distance apart. The pneumatic impact strength is measured by the loss in kinetic energy of the ball due to rupturing of the film sample and it is calculated from the following formula:

$$P = K(V_f^2 - V_i^2)$$

wherein:
P is pneumatic impact strength
K is a constant $V_f$ is velocity of steel ball in free flight
$V_i$ is velocity of steel ball in impeded flight.
The constant K is directly proportional to the weight of the projectile and inversely proportional to the acceleration due to gravity, as described in instructions for the ball impact tester, manufactured by T. M. Long, Somerville, N.J.

Tear phenomena is measured as Elmendorf tear strength (by the method ASTM D-1922-61-T) which measures the resistance to tear upon application of opposed forces acting along a line perpendicular to the film surface. A practical maximum for this film use is found to be 50 g./mil (0.001 in.).

The nominal thicknesses reported in the tables vary slightly from the actual thicknesses upon which reputed properties depend.

SAMPLES 1-10

Samples 1-6 were prepared from polyethylene terephthalate of intrinsic viscosity 0.53 to 0.62 (60/40 tetrachloroethylene/phenol at 25° C.) wherein molten polymer was extruded from a slit orifice onto a cool quench roll to form an amorphous film using the method and apparatus as described in U.S. Pat. No. 3,223,757 to Owens et al., with full wire pinning. This amorphous film was stretched first in the longitudinal or machine direction (MD) at 80°-81° C. and then, after preheating at 95° C., was stretched in the transverse direction in a tenter frame at 90° C. Films 7-10 were stretched only in the machine direction. All films were heat set to the indicated densities. pneumatic impact tests were run at a ball velocity of 40 ± 2 meters per second. Mechanical and optical properties of Samples 1-6 at various levels of stretch ratio are shown in Table I.

Samples 1, 2 and 3 are unacceptable because the impact values are too high. It should be observed that these samples had a high elongation at break; on impact testing, they ruptured with a ductile fracture, and had high tensile strength and high elongation characteristic of non-frangible films. The film of Samples 4, 5 and 6, however, ruptures with brittle fracture, with low elongation at break and low tensile strength at break, measured in one direction of the film. These film samples are characterized by low impact strength. With relatively high birefringence values, relatively high modulus (300 kpsi), they are acceptable for protective shield use applications. Additionally, it should be observed that the balanced film sample, designated Sample 1, is unacceptable from the high impact value and from the low retardation value.

In a similar manner, as shown in Table II, Elmendorf tear strength of the film of this invention is an alternate criterion of acceptability, being a function of the fibrillation or frangibility tendency. Elmendorf tear strength is a measure of the susceptibility to tear of a film subjected to a force normal to the surface. The tear strength of the film of this invention should be less than 50 g./mil.

The sample films in Table II were variably stretched and heat set, as indicated by variations in stretch ratio and density. Longer heat setting times at 150° C. resulted in higher density levels. This table illustrates that films having, in at least one direction, both low elongations at break (less than 50%) and in the same direction low tensile at break (less than 12 kpsi), have low tear strengths in the opposite direction. Sample 9 is indicative of insufficient heat setting, i.e., a density less than 1.360, resulting in high elongations at break coupled with a low tensile strength, causing ductile fracture and high tear strength.

Accordingly, a frangible polymeric film of the present invention has at least one of the following characteristics: (1) a total pneumatic impact strength of less than 10 kg.-cm.; (2) less than 50% elongation in at least one direction at break and in the same direction less than 12,000 psi tensile at break; (3) an Elmendorf tear strength in at least one direction of less than 50 g./mil.

Further, as a guide to achieving these basic characteristics required for frangibility, there are several interacting process conditions or film properties which must be taken into consideration:

1. The stretch ratio, including the ratio of the extent of stretch in the major direction to the minor direction;
2. The crystallinity, or density, as effected by heat setting;
3. The molecular weight of the polymer in the film.

The interaction of these factors is complex, as is known to those skilled in the art and from the prior art, for example, British patent specification No. 1,131,523 to Heffelfinger and U.S. Pat. No. 2,975,484 to Amborski. It is known, for example, that as the degree of asymmetry of orientation of predominately uniaxially oriented films of polymers, such as polyethylene terephthalate films, increases, the tendency to fibrillate after heat setting increases. This tendency is enhanced by increases in crystallinity (as effected by heat setting and commonly determined from density measurements). For example, as taught by the art cited, one-way oriented, heat set films of viscosity levels below about 0.65 fibrillate; however, by imparting a slight degree of orientation, above 1.6 stretch ratio in a direction transverse to the direction of principal orientation, fibrillation does not occur. On the other hand, asymmetrically oriented film which is only slightly heat set, as shown by Sample 9 of Table II, of a density below about 1.3600 g./cc. shows little tendency to fibrillate. Further, the art shows that above an intrinsic viscosity of 0.65 (60/40 tetrachloroethane/phenol), fibrillation does not occur in films which were stretched 4X in one direction only and heat set to densities as high as 1.400.

To some extent, however, the desired fibrillation tendency can be increased by increasing the stretch ratio and the density. There is a limit, however, to the fibrillation tendency which can be tolerated in a shield for glazing. Films of excessive combinations of unbalanced orientation and heat setting at lower viscosity levels (e.g., 0.40 to 0.70) tend to be not only frangible, but are so mechanically unstable that they cannot tolerate even slight impact without shattering. Generally, however, such films are eliminated from use as a result of the inability to handle such films in production or processing.

SAMPLE 11

A polyethylene terephthalate film was produced from a polymer flake free of particulate additives of normal viscosity 0.55 to 0.60 (60/40 tetrachloroethane/phenol) by casting molten polymer onto a casting drum using the method and apparatus described in U.S. Pat. No. 3,223,757 to Owens et al. with full sheet electrostatic pinning. The film was not stretched in a machine direction (MD) and was stretched 3.5 times in a transverse machine direction (TD) in a tenter frame. Film temperatures were 94° C. entering the TD stretching section and 115° C. leaving the stretching section. The film was heat set at 150° C. under restraint. Short sections were tested and found to be free of color fringes upon viewing partially polarized light between crossed polarizing filters. Birefringence values of $\geq 0.0888$ were obtained on 0.003 inch thick film (a retardation of 6600 millimicrons). The film was laminated to a 15-mil ply of polyvinyl butyral to form a two-ply laminated structure. When this structure is laminated to a standard glass layer of a glazing structure comprised of glass, polyvinyl butyral and glass is tested, it is free of color fringes and has satisfactory impact properties.

SAMPLE 12

Particulate additive-free polyethylene terephthalate film was produced with an intrinsic viscosity of 0.60 by casting molten polymer onto a casting drum using the method and apparatus as described in U.S. Pat. No. 3,223,757 to Owens et al. with full sheet electrostatic pinning. Film 4 mils thick was prepared by stretching the cast film 1.25 times MD and 3.5 times TD. The film was stretched MD at 81° C. and TD at a temperature of 100° C. and was heat set at 150° C. under restraint. The film was flame treated on both sides. This film has a birefringence of 0.07 and a retardation value of 7,000 millimicrons and is free of color fringes when viewing partially polarized light between crossed polarizing filters. It also has satisfactory impact properties.

SAMPLE 13

A polyethylene terephthalate film was produced from a polymer free of particulate additives having an intrinsic viscosity of 0.60-0.62 wherein molten polymer was extruded and doctored onto a cool casting wheel to form an amorphous film using the method and apparatus as described in U.S. Pat. No. 2,754,544 to Biher. The extrusion temperature at the casting die was 275° C. and the extrusion rate was 550 lbs./hr. at 29.3 ft./min. The casting wheel coolant temperature was 33° C. and the casting hopper or die was mounted top dead center in relationship to the casting wheel. A calender roll was mounted at 45° (in th direction of rotation) from the die in intimate contact with the cast sheet. Air impingement cooling plenums were circumferentially mounted around the casting wheel between the calender roll and a stripper roll which was positioned at 300° (in the direction of rotation) from the hopper. The film was not stretched in a machine direction (MD) and was stretched 3.55 times in a transverse machine direction (TD) in a tenter frame. In the tenter frame the film temperature leaving the preheating zone was 80° C., the stretching temperature was 85° C. and the air temperature was 95° C. The film after stretching was heat set to a density of 1.3753 gms./cc. The cooling section temperature was (65° C. with 1,000 ft./min. air velocity. The film produced was 9 mils thick. Its properties are shown in Table III. The film, with its surfaces properly conditioned by contact with a flame, was coated on one surface with an "Abcite ®" abrasion-resistant coating comprising (1) a fluorocarbon containing copolymer, and (2) polysilicic acid (73 parts of the copolymer of 50% by weight of tetrafluoroethylene and 50% by weight of hydroxybutyral vinyl ether and 27 parts of the polysilicic acid) and various samples of the coated film were cured at 135° C. for 16–24 hours and were laminated to a 15-mil ply of polyvinyl butyral to form a three-ply laminated structure. When this structure is then laminated to a standard glass layer of a glazing structure comprised of glass, polyvinyl butyral and glass and is tested, it has satisfactory optical and impact properties.

SAMPLE 14

A polyethylene terephthalate film was produced from a particulate additive-free polymer having an intrinsic viscosity of 0.60-0.62 wherein molten polymer was extruded and doctored onto a cool casting wheel to form an amorphous film using the method and apparatus as described in U.S. Pat. No. 2,754,544 to Bicher. The extrusion temperature at the casting die was 275° C. and the extrusion rate was 550 lbs./hr. at 29.3 ft./min. The casting wheel coolant temperature was 34° C. and the casting hopper or die was mounted top dead center in relationship to the casting wheel. A calender roll was mounted at 45° (in the direction of rotation) from the die in intimate contact with the cast sheet. Air impingement cooling plenums were circumferentially mounted around the casting wheel between the calender roll and a stripper roll which was positioned at 200° (in the direction of rotation) from the hopper. The film was not stretched in a machine direction (MD) and was stretched 3.55 times in a transverse machine direction (TD) in a tenter frame. In the tenter frame the film temperature leaving the preheating zone was 81.5° C., the stretching section air temperature was 99° C. The film after stretching was heat set at a temperature of 144° C. The cooling section temperature was 46° C. with 500 ft./min. air velocity. The film produced was 8.5 mils thick. Its properties are shown in Table III. This film, from two different rolls and designated Sample 14(A) and 14(B), is substantially free of optical distortion and has no gauge deviation greater than 1% per inch along its surface. The film, with its surfaces properly conditioned by contact with a flame, was coated on one surface with an "Abcite ®" abrasion-resistant coating comprising (1) a fluorocarbon containing copolymer, and (2) polysilicic acid (73 parts of the copolymer of 50% by weight of tetrafluoroethylene and 50% by weight of 4-hydroxybutyl vinyl ether and 27 parts of the polysilicic acid) and various samples of the coated film were cured at 135° C. for 16–24 hours and were laminated to a 15-mil ply of polyvinyl butyral to form a three-ply laminated structure. When this structure is then laminated to a standard glass layer of a glazing structure comprised of glass, polyvinyl butyral and glass and is tested, it has satisfactory optical and impact properties.

pressure was 60 lbs./sq. in. The line speed was 150 ft./min. The coating was extrusion coated on the film at 2-mil thickness. The film was 36-inch wide, nominal 10-mil thick roll (52829A), which was coated on the flame treated side. This two-ply structure is free of color fringes and has satisfactory impact properties.

Table I

| Sample | Nominal Thickness (mils) | Stretch Ratio MD | Stretch Ratio TD | Density (g.cc.) | Tensile Strength (kpsi) MD | Tensile Strength (kpsi) TD | % Elongation MD | % Elongation TD | Impact of Sample (kg.-cm.) | Birefringence Min. | Birefringence Max. | Retaratation (mµ) Min. | Retaratation (mµ) Max. |
|---|---|---|---|---|---|---|---|---|---|---|---|---|---|
| 1 | 4.0 | 3.5 | 3.5 | 1.3939 | 25.0 | 29.7 | 121 | 118 | 20.7 | .0130 | .0252 | 1300 | 2500 |
| 2 | 4.0 | 2.0 | 3.5 | 1.3782 | 22.0 | 34.2 | 306 | 127 | 17.6 | .0491 | .0659 | 4200 | 5700 |
| 3 | 4.0 | 1.75 | 3.5 | 1.3779 | 17.7 | 34.6 | 348 | 114 | 17.4 | .0614 | .0672 | 5900 | 7300 |
| 4 | 4.0 | 1.25 | 3.5 | 1.3788 | 11.1 | 35.4 | 5.0 | 119 | 4.5 | .0878 | .0938 | 8600 | 8900 |
| 5 | 7.0 | 1.25 | 3.5 | 1.3746 | 11.3 | 25.8 | 6.2 | 227 | 6.9 | .0693 | .0907 | 13900 | 17600 |
| 6 | 2.7 | 1.0 | 3.5 | 1.3788 | 11.2 | 34.0 | 5.2 | 84 | 2.5 | .0880 | .1045 | 6000 | 6800 |

Notes:
1 All samples had modulus values MD and TD above 300,000 pounds/sq. in.
2 Sample 1, although nominally of balanced orientation, had residual birefringence and low retardation, produced color fringes upon viewing in polarized light, and was optically, as well as mechanically, unacceptable.

Table II

| Sample | Thickness (mils) | Stretch Ratio MD | Stretch Ratio TD | Density (g./cc.) | Tensile (Kpsi) MD | Tensile (Kpsi) TD | % Elongation MD | % Elongation TD | Elmendorf Tear (g./mil) MD | Elmendorf Tear (g./mil) TD |
|---|---|---|---|---|---|---|---|---|---|---|
| 7 | 1.01 | 3.0 | 1.0 | 1.3656 | 27.3 | 10.1 | 96 | 4 | 12 | 286 |
| 8 | 1.10 | 3.0 | 1.0 | 1.3752 | 16.9 | 9.0 | 61 | 6 | 35 | 458 |
| 9 | 0.84 | 4.0 | 1.0 | 1.3570 | 46.7 | 7.2 | 49 | 184 | 151 | 237 |
| 10 | 1.08 | 4.0 | 1.0 | 1.3648 | 16.3 | 7.9 | 46 | 5 | 34 | 828 |

TABLE III

| Property | | Sample 13 (52828) | Sample 14(A) (653-138-1) | Sample 14(B) (653-138-2) |
|---|---|---|---|---|
| Nominal Thickness (mils) | | 9.0 | 8.5 | 8.5 |
| Modulus (Kpsi) | MD | 264 | 260 | 302 |
| | TD | 548 | 560 | 570 |
| Tensile Strength (Kpsi) | MD | 10.1 | 11.5 | 11.6 |
| | TD | 38.1 | 37.8 | 36.9 |
| % Elongation | MD | 6.0 | 9.0 | 7.0 |
| | TD | 122. | 139. | 133. |
| F$_5$ (Kpsi) | MD | 9.4 | 9.6 | 10.3 |
| | TD | 15.9 | 14.4 | 15.3 |
| Density (g./cc.) | | 1.3753 | 1.3777 | 1.3787 |
| Haze % | Total | 2.3 | 0.4 | 1.5 |
| | Internal | 0.6 | 0.1 | 0.7 |
| | Surface | 1.7 | 0.3 | 0.8 |
| Birefringence | | .1016 | .1000 | .0971 |
| Retardation (mµ) | | 22200 | 21590 | 21940 |
| Pneumatic Impact (kg.-cm.) (115 m./sec. ball) | | 6.6 | 6.5 | 6.3 |

SAMPLE 15

A polyethylene terephthalate film was produced as described in Sample 13 and a laminated structure was made from it, also as described in Sample 13 except an ionic hydrocarbon polymer coating of ethylene/methacrylic acid copolymer containing 10 mole percent of the acid and 50% neutralized with a sodium ion and wherein the melt flow index is 1.2 was substituted for the polyvinyl butyral ply. The coating was extruded onto the film surface using a Hartig extruder, and Egan multistage screw, an Egan 42 inch, Series 32 die with a 20-mil gap deckled to 39 inches. The chill roll temperature was 48° F. and neoprene pressure roll was used. The air gap was 4½ inches. The die temperature was 610° F. The pressure was 1,850 lbs./sq. in. and the nip

We claim:
1. An article of manufacture suitable for use in optically transparent glass laminar structures comprising a frangible, dimensionally stabilized and optically transparent film structure of crystalline polyethylene terephthalate which is asymmetrically oriented by stretching 1.0 to 1.25 times in one direction in the plane of the film and about from 3 to 4 times in a second direction in the plane of the film, the film having a pneumatic impact strength of less than 10 kg.-cm., a tensile strength at break of less than 12,000 psi in at least one direction of said film and an elongation at break of less than 50% in the same film direction, a shrinkage of less than 5% in any direction at 135° C., an optical retardation of about from 5,000 to 7,000 millimicrons, a thickness of at least 1 mil and a gauge deviation of less than 1% per inch along the surface of said film, wherein said film structure is substantially free of color fringes upon viewing in partially polarized light.

2. The article of claim 1 wherein said polyethylene terephthalate film structure has an intrinsic viscosity of between 0.40 and 0.70 as measured at 25° C in 60/40 tetrachloroethylene/phenol and a density of between 1.360 and 1.400.

* * * * *